Patented July 26, 1938

2,124,881

UNITED STATES PATENT OFFICE 2,124,881

AZO DYES AND PROCESS FOR MANUFACTURING THE SAME

Werner Lange, Dessau-Ziebigk-in-Anhalt, Germany, assignor to General Aniline Works, Inc., New York, N. Y., a corporation of Delaware No Drawing. Application July 25, 1936, Serial No. 92,689. In Germany July 27, 1935

12 Claims. (Cl. 260—12)

My present invention relates to a new process for manufacturing azo dyes and to the new dyes obtained by the said process.

This invention is based on the discovery that dyes especially suitable for dyeing chrome leather and vegetable tanned leather are obtained by after-treating the monoazo dyes obtained by coupling diazotized aminodiphenylamine-sulfonic acids and an ortho-dihydroxybenzene with salts of metals, particularly copper or chromium, and/or oxidizing them, with air or another oxidizing agent. Advantageous derivatives of 1,2-dihydroxybenzene are 1,2,3-trihydroxybenzene and 1,2,4-trihydroxybenzene.

Known dyes, obtained by coupling diazotized nitro-aminodiphenylaminesulfonic acid and 1,3-dihydroxybenzene, and after-treating with air in the presence of ammonia and a metal, give a red-brown to dark-brown tone. In contradistinction to these, the dyes prepared by this invention dye leather in valuable Havana brown to olive-tinged brown tones.

The following examples illustrate the invention, the parts being by weight:—

*Example 1.*—30.9 parts of 4'-nitro-4-aminodiphenylamine-2'-sulfonic acid are diazotized in known manner, and added to a solution containing 11 parts of 1,2-dihydroxybenzene. The mineral acid is neutralized with sodium acetate and the coupling is complete after several hours stirring at 35 to 40° C. The solution is then made alkaline by sodium carbonate and air is bubbled through it for 1 to 3 days while stirring. The solution becomes yellow. The dye is separated in the usual manner by salting out.

This dye dyes chrome leather olive-tinged havana brown, and vegetable tanned sheep leather yellow-tinged Havana brown. The colors have good fastness.

Instead of air other mild oxidizing agents, for example hydrogen peroxide, may be used to oxidize the dye.

*Example 2.*—The dye obtained before oxidation by the method described in Example 1 is, after it has been finished in alkaline solution, mixed with a solution of 25 parts of copper sulfate saturated with ammonia. This mixture is stirred for an hour at about 80° C. The dye is then salted out.

This dye dyes chrome leather and vegetable tanned leather colors similar to those of Example 1, and the colors are equally fast.

*Example 3.*—30.9 parts of 4'-nitro-4-aminodiphenylamine-2'-sulfonic acid are diazotized and mixed at 0° C. with a solution which is alkaline with sodium carbonate and contains 12.6 parts of 1,2,3-trihydroxybenzene. When the coupling is complete, air is blown through as in Example 1, whereupon the solution becomes a rather opaque yellow. The dye is salted out. It dyes chrome calf leather and vegetable tanned leather beautiful fast Havana brown.

If the finished dye oxidized by air is treated as in Example 2 with a copper salt in alkaline solution, a dye is obtained which dyes chrome calf leather an olive-tinged Havana brown very similar to that obtained in Example 2. On vegetable tanned leather the tone of the dye treated with copper is essentially more subdued than that of Example 2.

If the dye obtained by the first paragraph of Example 3 is boiled for some hours with a solution of a chromium salt corresponding with 15.2 parts of chromium oxide, a dye is obtained having color and properties similar to those of the dye obtained when a copper salt is used.

*Example 4.*—30.9 parts of 4'-nitro-4-aminodiphenylamine-2'-sulfonic acid are diazotized and mixed with 12.6 parts of 1,2,3-trihydroxybenzene as in Example 3. The dye solution is then warmed, immediately after the coupling is completed, and is mixed with a solution containing 50 parts of copper sulfate saturated with ammonia and stirred for about 1 hour at 80° C. The dye is then salted out.

This dye dyes chrome leather and vegetable tanned leather covered Havana browns which are better covered and not so green- or yellow-tinged as the tones of Example 3, but have equally good properties of fastness.

*Example 5.*—29.4 parts of 4-amino-4'-methoxy-diphenylamine-2-sulphonic acid are diazotized in the usual manner. The diazo compound is introduced into a solution containing 11 parts of 1,2-dihydroxybenzene and a substance binding free inorganic acid. The mixture is stirred until coupling has finished. To the alkaline solution of the dye a solution of 25 parts of copper sulfate is added and the mixture is warmed for some time until the copper is taken up by the dye. Then air is bubbled through the alkaline solution whereby the solution becomes more yellow. This treatment with air may be shortened by raising the temperature and by a fine distribution of the air bubbles. The dye is salted out in the usual manner; it dyes vegetable tanned leather Havana brown tints of good fastness.

It is obvious that my invention is not limited to the foregoing examples or to the specific details given therein. Thus, I may use, for instance, as diazo component 4-aminodiphenylamine-2- sulfonic acid, 4-amino-4'-methyl-diphenylamine-2-sulfonic acid, 4-amino-4'-acetylaminodiphenylamine-2-sulfonic acid, 4-amino-2'-methoxydiphenylamine-2-sulfonic acid, 4-amino-4'-methoxydiphenylamine-2-sulfonic acid. Furthermore, as azo component the 1,2,4-trihydroxybenzene likewise is useful.

What I claim is:—

1. The process which comprises diazotizing an aminodiphenylaminesulfonic acid, coupling the diazo compound in the absence of free inorganic acid with a hydroxybenzene compound of the general formula

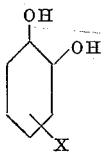

wherein X is a member of the group consisting of H and OH, and subjecting the monoazo dye thus obtained to an oxidation process with an oxidizing agent of the group consisting of air, hydrogen peroxide, a salt of bivalent copper, and cuprammonium salts.

2. The process which comprises diazotizing an aminodiphenylamine sulfonic acid, coupling the diazo compound in the absence of free inorganic acid with a hydroxybenzene compound of the general formula

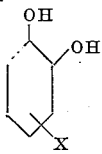

wherein X is a member of the group consisting of H and OH, subjecting the monoazo dye thus obtained to an oxidation process with an oxidizing agent of the group consisting of air, hydrogen peroxide, a salt of bivalent copper, and cuprammonium salts, and transforming it into a metal complex compound.

3. The process which comprises diazotizing an aminodiphenylaminesulfonic acid, coupling the diazo compound in the absence of free inorganic acid with a hydroxybenzene compound of the general formula

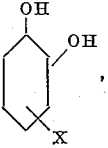

wherein X is a member of the group consisting of H and OH, subjecting the monoazo dye thus obtained to an oxidation process with an oxidizing agent of the group consisting of air, hydrogen peroxide, a salt of bivalent copper, and cuprammonium salts, and transforming it into the copper complex compound.

4. The process which comprises diazotizing an aminodiphenylaminesulfonic acid, coupling the diazo compound in the absence of free inorganic acid with 1,2-dihydroxybenzene and subjecting the monoazo dye thus obtained to an oxidation process with an oxidizing agent of the group consisting of air, hydrogen peroxide, a salt of bivalent copper, and cuprammonium salts.

5. The process which comprises diazotizing 4'-nitro-4-aminodiphenylamine-2'-sulfonic acid, coupling the diazo compound with 1,2-dihydroxybenzene in the absence of free inorganic acid and subjecting the monoazo dye to an oxidation process with an oxidizing agent of the group consisting of air, hydrogen peroxide, a salt of bivalent copper, and cuprammonium salts.

6. The process which comprises diazotizing 4'-nitro-4-aminodiphenylamine-2'-sulfonic acid, coupling the diazo compound with 1,2-dihydroxybenzene in the absence of free inorganic acid, subjecting the monoazo dye to an oxidation process with an oxidizing agent of the group consisting of air, hydrogen peroxide, a salt of bivalent copper, and cuprammonium salts, and transforming the dye into a metal complex compound.

7. The process which comprises diazotizing 4-amino-4'-methoxydiphenylamine - 2' - sulfonic acid, coupling the diazo compound with 1,2-dihydroxybenzene in the absence of free inorganic acid, and subjecting the monoazo dye to an oxidation process with an oxidizing agent of the group consisting of air, hydrogen peroxide, a salt of bivalent copper, and cuprammonium salts.

8. The process which comprises diazotizing 4-amino-4'-methoxydiphenylamine - 2' - sulfonic acid, coupling the diazo compound with 1,2-dihydroxybenzene in the absence of free inorganic acid, subjecting the monoazo dye to an oxidation process with an oxidizing agent of the group consisting of air, hydrogen peroxide, a salt of bivalent copper, and cuprammonium salts, and transforming the dye into a metal complex compound.

9. The dyes as obtainable according to claim 1.
10. The dyes as obtainable according to claim 2.
11. The dyes as obtainable according to claim 6.
12. The dyes as obtainable according to claim 8.

WERNER LANGE.